Jan. 19, 1971     W. F. NICODEMAS     3,555,937

DIAMOND DRILL

Filed May 17, 1968

INVENTOR.
WILLIAM F. NICODEMUS
BY
Melvin A. Crosby

# United States Patent Office 3,555,937
Patented Jan. 19, 1971

3,555,937
DIAMOND DRILL
William F. Nicodemas, Greensburg, Pa., assignor to
Kennametal Inc., Latrobe, Pa.
Filed May 17, 1968, Ser. No. 729,961
Int. Cl. B23b *51/06*
U.S. Cl. 77—68                    5 Claims

ABSTRACT OF THE DISCLOSURE

Drilling tool having a hollow carbide shank with steel head fixed to one end and a diamond cutting element fixed in the steel head with a passage through the steel head so suction or pressure can be applied to the hollow sank to remove ground off material from the bore being made by the tool.

---

This invention relates to boring tools and is particularly concerned with a novel boring tool having a diamond cutting element mounted on a carbide shank.

Boring and drilling tools are, of course, well known and such tools having diamonds as the cutting element are also known. The present invention is particularly concerned with an improved boring tool having a diamond as the cutting element.

A particular class of work in which it is extremely difficult to form bores economically is the class of work pieces formed of one or more metal carbides, tungsten or titanium carbide, for example, held together by a metallic bonding material. In the manufacture of carbide members, metallic carbide powder is admixed with the binder metal in powdered form together with a material which will cause the powder particles to adhere to each other when compacted under pressure. After the powders have been compacted, the resulting article, when removed from the cavity in which it was formed, is extremely fragile and can only be handled with great care and cannot be machined in any way. By heating the article to somewhat below the sintering temperature, a presintering operation is carried out in which the particles become bonded together but are not fully sintered together in the form of a hard compact. The presintered, or green, object can be handled, observing some care, and can be machined to the desired configuration by grinding, boring and cutting operations. Following such operations, the article is sintered completely and forms a hard compact that can be further machined only by the use of such cutting devices as diamond wheels and the like.

The present invention is particularly concerned with a tool for boring the presintered objects. Even though the article, when presintered, is machinable, it is, nevertheless, extremely abrasive because of the carbide particles from which the article is made. Heretofore, no devices have been made which can form accurate holes in such presintered articles and do so economically. The best steels can only drill a few holes in fairly thin presintered carbide articles until they are worn down to the point of uselessness. Holes in thick presintered articles have heretofore been substantially impossible to drill on any economic basis.

With the foregoing in mind, the present invention has as a particular object the provision of a boring or drilling tool especially adapted for drilling presintered or green carbide articles and doing so quite economically.

A still further object of the present invention is the provision of a boring or drill tool especially adapted for drilling green carbide compacts but not limited thereto and which is easy to fabricate and has long life.

Another object of this invention is the provision of a drill or boring tool of the nature referred to which will form clean, sharp, straight holes not only in green carbide compacts but in other workpieces as well.

A still further object of this invention is the provision of a boring or drilling tool of the nature referred to in which each shank size can be employed for a number of different drill sizes.

The foregoing objects of the present invention as well as still other objects and advantages thereof become more apparent upon reference to the following detailed specification taken in connection with the accompanying drawings in which.

Figure 1:
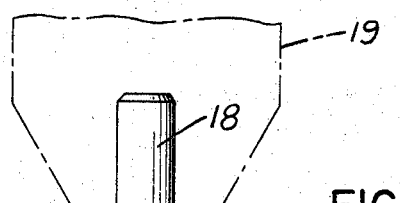
FIG. 1 is a view, partly in section, showing a tool according to the present invention.
Figure 2:
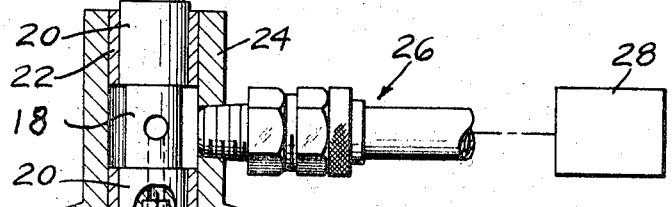
FIG. 2 is a side view of the cutting element end of the tool drawn at enlarged scale and without the cutting element.
Figure 2:
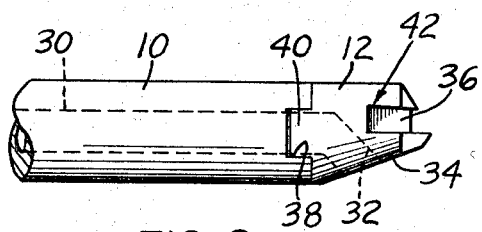
Figure 3:
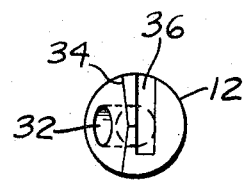
FIG. 3 is a view looking in at the cutting element end of the tool and also without the cutting element.
Figure 4:
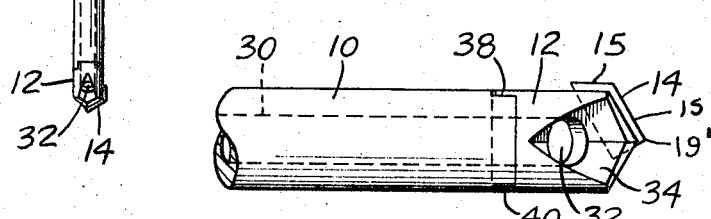
FIG. 4 is a view of the cutting element end of the tool with the cutting element in place.

Referring to the drawing somewhat more in detail, the boring or drilling tool according to the present invention will be seen to comprise a hollow carbide shank 10 which has fixed to one end a short steel head 12 with a diamond 14 therein. Shank 10 is fixed at the other end, as by brazing or epoxy cement, to a holder or journal member 16.

A central passage 30 extending through shank 10 communicates by way of passage 17 in journal member 16 with the annular recess 18 formed in the journal member between the ends thereof. Journal member 16 has portions 20 supported in sleeve bearings 22 which are carried in a holder 24 which has connected thereto a conduit 26 leading to a source 28 of air under pressure or suction.

The end 18 of journal member 16 opposite its connection to shank 10 is arranged for being held in a chuck 19 which is driven so that the said journal member 16 and shank 10 of the drilling and boring tool, together with steel head 12 and diamond 14, will be driven in rotation. Member 24 remains stationary and thus forms a rotary joint for fluid communication with passage 30 in shank 10.

Shank 10 is provided with a lateral slot 38 which receives tongue 40 on the backside of the steel head 12. Steel head 12, in turn, supports the diamond cutting element 14. Cutting element 14 extends radially from steel head 12 to beyond the outer limits of shank 10 so that when a hole is made with the tool, there will be clearance around the steel head 12 and the shank 10 through which the cut off particles of the work member can pass, or through which air can pass when the cut off particles are removed by suction.

The steel head 12 may be brazed or cemented to shank 10 and shank 10, in turn, may be brazed or cemented to journal member or holder 16.

It will be evident that one shank 10 can be used for the manufacture of a plurality of drills of different sizes merely using different heads 12 and different diamonds 14. A fairly small number of shank members will thus provide for a great many drill sizes.

As is known, the modulus of elasticity of carbide, such as cemented tungsten carbide, is about three times as high as that of steel so that the shanks 10 are highly resistant to lateral deflection and thus tend to drill straight, true holes even when subjected to some lateral loading.

Further, when shanks 10 are made of cemented metal carbide, they are extremely resistant to abrasion and will scarcely be affected by the carbide powders cut from a green carbide article by the diamond cutting element so that extremely long life of the drills is obtained. The steel head 12 will, of course, be somewhat abraded, but a great deal of wear of the steel head can take place before the drilling tool must be serviced by replacing the steel head. Furthermore, by rapidly removing the powder resulting from the drilling operations, there is a minimum of abrading of the steel head.

A feature of the present invention is to be found in the slot 36 in which diamond 14 is mounted. As will be seen, slot 36 is somewhat dovetail in configuration in that it tapers from a narrower mouth end to a wider base portion. The diamond is similarly tapered and, when the diamond is fixed in the slot as by cementing, an extremely firm support of the diamond in the steel head is had. The angle of divergence of the walls of the slot 36 is indicated at 43 in FIG. 6 and may be about 2° to 4°.

The diamond element 14, in addition to radial cutting edge 15, has an inclined front axial cutting edge at 15' which terminates in point 19' located on the axis of rotation of the tool.

Figure 5:
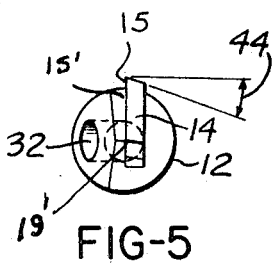
FIG. 5 is a view looking in from the right side of FIG. 4.
Figure 6:
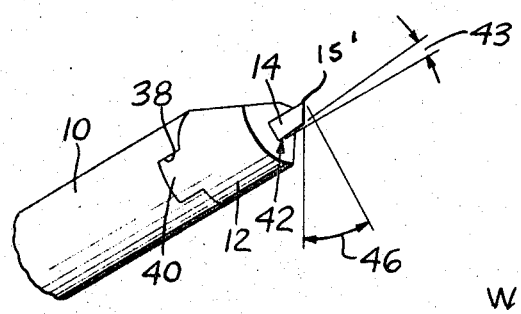
FIG. 6 is a view looking along the length of one cutting edge of the cutting element showing the clearance angles thereof.

As will be seen in FIGS. 5 and 6, clearances are provided behind the cutting edge as shown by the angles 44 and 46 so that the diamond presents its cutting edges to the best advantage to the surface being machined. Also, one side of the slot 36, namely, the side that engages the leading side of the diamond, is on a diameter of the steel head.

It has been found that holes of substantially any size from quite small up to substantial diameters, can be formed with drilling tools according to the present invention and that the tools have long life and maintain their accuracy indefinitely.

The tools are relatively inexpensive to manufacture and represent the first way known to the applicant to drill accurate holes economically in green carbide compacts. The drilling tool has other uses where long life and accurate cutting are important characteristics and can be used to drill substantially any materials.

It is possible to modify the present invention to adapt it to different conditions and such modification as fall within the scope of the appended claims are comprehended within the purview of the present invention.

What is claimed is:

1. A drilling tool especially adapted for drilling relatively small holes in highly abrasive materials and comprising; a slender tubular shank of cemented metal carbide, a steel head having a diameter not greater than that of said shank, a diamond cutting element fixed in the other end of said steel head and projecting axially from said other end of said steel head and also projecting radially from one side thereof, said diamond cutting element comprising a blade-like member disposed in a plane substantially parallel to the axis of said shank and having a front cutting edge on one face thereof which inclines toward the rear in the radially outward direction, said cutting element also having an axially directed side cutting edge on the same said face, said front cutting edge terminating at one end substantially on the axis of said drilling tool and at the other end at the forward end of said side cutting edge, said cutting edges being coplanar and being disposed substantially in an axial plane of said shank, said one face of said cutting element forming the leading side thereof with respect to the direction of rotation of said shank, and a passage formed in said steel head connecting the external region thereof on the leading side of said cutting element with the interior of said shank for the movement of air through the shank and head to remove from the region of the cutting element the material cut off from a workpiece thereby, said cutting element having relief clearance formed thereon behind said cutting edges.

2. A drilling tool according to claim 1 in which said steel head is formed with a slot in the said other end thereof for receiving said cutting element, the slot in said steel head having one side disposed substantially in the plane of the axis of said tool and the other side of the slot being divergent from said one side thereof in the direction toward the bottom of said slot, and said diamond cutting element being shaped to conform to the shape of said slot and being fixed in the slot with said leading side of the cutting element adjacent said one side of said slot.

3. A drilling tool according to claim 1 which includes a holder for said tool at the end of the shank opposite said steel head, said holder being adapted at one end for mounting in a chuck and at the other end being fixed to said shank, a stationary sleeve within which said holder is rotatable, and air passage means extending through said sleeve and holder and connected with the interior of said shank.

4. A drilling tool according to claim 1 in which the said one end of said shank is diametrally grooved and said steel head has a diametral tongue thereon extending into the groove in the shank.

5. A drilling tool according to claim 1 in which said steel head is provided with a slot in the said other end thereof for receiving the said cutting element, said slot being wider at the bottom than at the mouth thereof.

References Cited

UNITED STATES PATENTS

| 134,506 | 1/1873 | Ball | 175—329 |
| 619,450 | 2/1899 | Turton | 77—68X |
| 3,333,489 | 8/1967 | Mossberg | 77—68 |

OTHER REFERENCES

Publication: Everede Tool Co., catalog PB-62, "Production Boring-Bars With Solid Carbide Shanks."

FRANCIS S. HUSAR, Primary Examiner

U.S. Cl. X.R.

175—329